United States Patent [19]

DiBrino

[11] Patent Number: 5,371,894
[45] Date of Patent: Dec. 6, 1994

[54] OFF-CHIP BREAKPOINT SYSTEM FOR A PIPELINED MICROPROCESSOR

[75] Inventor: Michael T. DiBrino, Kingston, N.Y.

[73] Assignee: International Business Machines Corporation, Armonk, N.Y.

[21] Appl. No.: 171,985

[22] Filed: Dec. 23, 1993

Related U.S. Application Data

[63] Continuation of Ser. No. 700,000, May 13, 1991, abandoned.

[51] Int. Cl.$^5$ ............................................. G06F 11/00
[52] U.S. Cl. ...................................... 395/800; 395/575; 395/375; 364/DIG. 2; 364/941; 364/DIG. 1; 364/267.4
[58] Field of Search ....................... 395/800, 575, 375; 371/12, 19

[56] References Cited

U.S. PATENT DOCUMENTS

| | | | |
|---|---|---|---|
| 3,937,938 | 2/1976 | Matthews | 371/19 |
| 4,080,650 | 3/1978 | Beckett | 395/500 |
| 4,338,660 | 7/1982 | Kelley et al. | 395/575 |
| 4,429,368 | 1/1984 | Kurii | 364/580 |
| 4,635,193 | 1/1987 | Moyer et al. | 395/375 |
| 4,675,646 | 6/1987 | Lauer | 340/146.2 |
| 4,742,452 | 5/1988 | Hirokawa | 395/325 |
| 4,813,009 | 3/1989 | Tallman | 395/500 |
| 4,819,234 | 4/1989 | Huber | 371/19 |
| 4,860,195 | 8/1989 | Krauskopf | 395/400 |
| 4,866,665 | 9/1989 | Haswell-Smith | 395/575 |
| 4,879,646 | 11/1989 | Iwasaki et al. | 395/375 |
| 4,942,524 | 7/1990 | Nunomura | 395/425 |
| 4,954,942 | 9/1990 | Masuda et al. | 395/500 |
| 4,972,388 | 11/1990 | Crawford et al. | 395/400 |
| 5,053,944 | 10/1991 | Krauskopf | 395/400 |
| 5,113,572 | 5/1992 | Dinwiddie | 395/700 |
| 5,165,027 | 11/1992 | Krauskopf | 395/400 |
| 5,173,872 | 12/1992 | Crawford et al. | 365/49 |

FOREIGN PATENT DOCUMENTS

| | | |
|---|---|---|
| 0271910 | 6/1988 | European Pat. Off. . |
| 57-85145 | 5/1982 | Japan . |
| 58-115546 | 7/1983 | Japan . |
| 1-154254 | 6/1989 | Japan . |

OTHER PUBLICATIONS

MC 88110 Second Generation RISC Microprocesser User's Manual; 1991.
Wilson; "As RISC Wars Escalate, Simplicity Seems to be First Casualty" *Computer Design*; Dec. 1, 1990.
"Motorola reveals 88000 strategy: 88110 previewed—88300 embedded strategy outlined: *Microprocessor Report*", Nov. 7, 1990.
MC88200 Cache/Memory Management Unit User's Manual, 1988, pp. 2.24–2.34, 7.1–7.5.
Alsup, "Motorola's 88000 Family Architecture" Jun. 1990, IEEE Micro.
"Motorola expands 88000 MPU line" Oct. 1990, Electronic News, Summary only "Data General Claims to Lead With Four-CPU Avion", Mar. 1991; Computergram International.
MC88100 RISC Microprocessor User Manual 1988, p. 8–3.

*Primary Examiner*—Alyssa H. Bowler
*Assistant Examiner*—L. Donaghue
*Attorney, Agent, or Firm*—Sterne, Kessler, Goldstein & Fox

[57] ABSTRACT

The invention is a system and method for providing a breakpoint exception at any predetermined instruction address in a processor system of the type including an integrated circuit microprocessor and an instruction cache and memory management unit (CMMU) where code addresses are sent to the instruction CMMU and the instruction CMMU returns with code instructions and returns with a FAULT code reply signal when there is no reply code, and wherein an exception is forced in the microprocessor in response to the FAULT code reply signal. The system comprises at least one breakpoint register for storing a predetermined breakpoint address, a means for comparing the code addresses which are sent to the CMMU with the predetermined breakpoint address in the breakpoint register and for generating a match signal when equivalent addresses are detected, and a means coupled to the CMMU and responsive to said match signal for causing said CMMU to issue a FAULT code reply signal, whereby an exception is forced in the microprocessor. The system is especially suitable for use with the Motorola MC88100 processor and MC88200 CMMU.

9 Claims, 6 Drawing Sheets

OFF-CHIP BREAKPOINT SYSTEM FOR A PIPELINED MICROPROCESSOR

This application is a continuation of application Ser. No. 07/700,000, filed May 13, 1991 now abandoned.

TECHNICAL FIELD

This invention relates to the field of hardware implemented breakpoints for computer programs, primarily used for analyzing or "debugging" programs.

BACKGROUND ART

An extremely useful software debugging tool is the breakpoint function. The breakpoint function forces program execution to terminate at a specific program address, at which point various registers and memory locations may be examined.

A breakpoint is accomplished by comparing processor generated addresses with a predetermined address. When a generated address matches a predetermined address, a breakpoint occurs. The operation of the computer is then interrupted to permit analysis.

One known method for implementing the breakpoint function is to modify the software (i.e., computer program) itself. At certain addresses in the software, a software "trap" could be provided. This method is relatively inexpensive, however, a serious disadvantage is that software must be modified. Software modification typically requires re-compilation or re-assembly of the code on a development system, followed by a new download into the memory of the target system. This takes a considerable amount of time. Worse yet, the code may be stored in non-writable memory (e.g., PROM or ROM) which requires replacement to effect a software change.

In another method, hardware external to the computer or microprocessor is used for breakpoint interrupts. This external hardware monitors the address stream generated by the processor as instructions are being fetched from memory, and compares each address to pre-determined breakpoint addresses. A breakpoint is generated upon finding a match. While this method has the advantage of not requiring changes to the software, it has several disadvantages.

The external hardware method generally requires expensive hardware and a significant amount of circuit board space. Further, for high speed processors, the system may not react quick enough to provide "real time" breakpoints. Additionally, for processors with memory management units (for address translation) on the microprocessor chip itself, the user may not have access to the virtual memory addresses. It is frequently not as useful to set breakpoints on physical addresses (as opposed to logical addresses). Thus, to access logical addresses, the breakpoint hardware must often be designed into the chip itself.

DISCLOSURE OF INVENTION

The invention is a system and method for providing a breakpoint exception at any predetermined instruction address in a processor system of the type including an integrated circuit microprocessor and an instruction cache and memory management unit (CMMU) where code addresses are sent to the instruction CMMU and the instruction CMMU returns with code instructions and may return with a FAULT code reply signal on occurrence of an exception from a normal instruction fetch. The microprocessor is forced into an exception condition in response to the FAULT code reply signal. The system comprises at least one breakpoint register for storing a predetermined breakpoint address, a means for comparing the code addresses which are sent to the CMMU with the predetermined breakpoint address in the breakpoint register and for generating a match signal when equivalent addresses are detected, and a means coupled to the CMMU and responsive to said match signal for causing said CMMU to issue a FAULT code reply signal, whereby the microprocessor is forced to take an exception. The system is especially suitable for use with a the Motorola MC88100 processor and MC88200 CMMU.

An advantage of the present invention is that a breakpoint may be set with no modification to existing code. Thus, recompilation and re-downloading time is saved.

Another advantage of the present invention is that precise exception handling is made possible.

Yet another advantage of the present invention is that a processor may be stepped a single cycle at a time.

The foregoing and other objects, features and advantages of the invention will be apparent from the following more particular description of preferred embodiments of the invention, as illustrated in the accompanying drawings.

BEST MODE FOR CARRYING OUT THE INVENTION

A breakpoint system and method is described which is particularly suited for use with the Motorola MC88100/MC88200 microprocessor/CMMU (Cache and Memory Management Unit) system.

Figure 1:
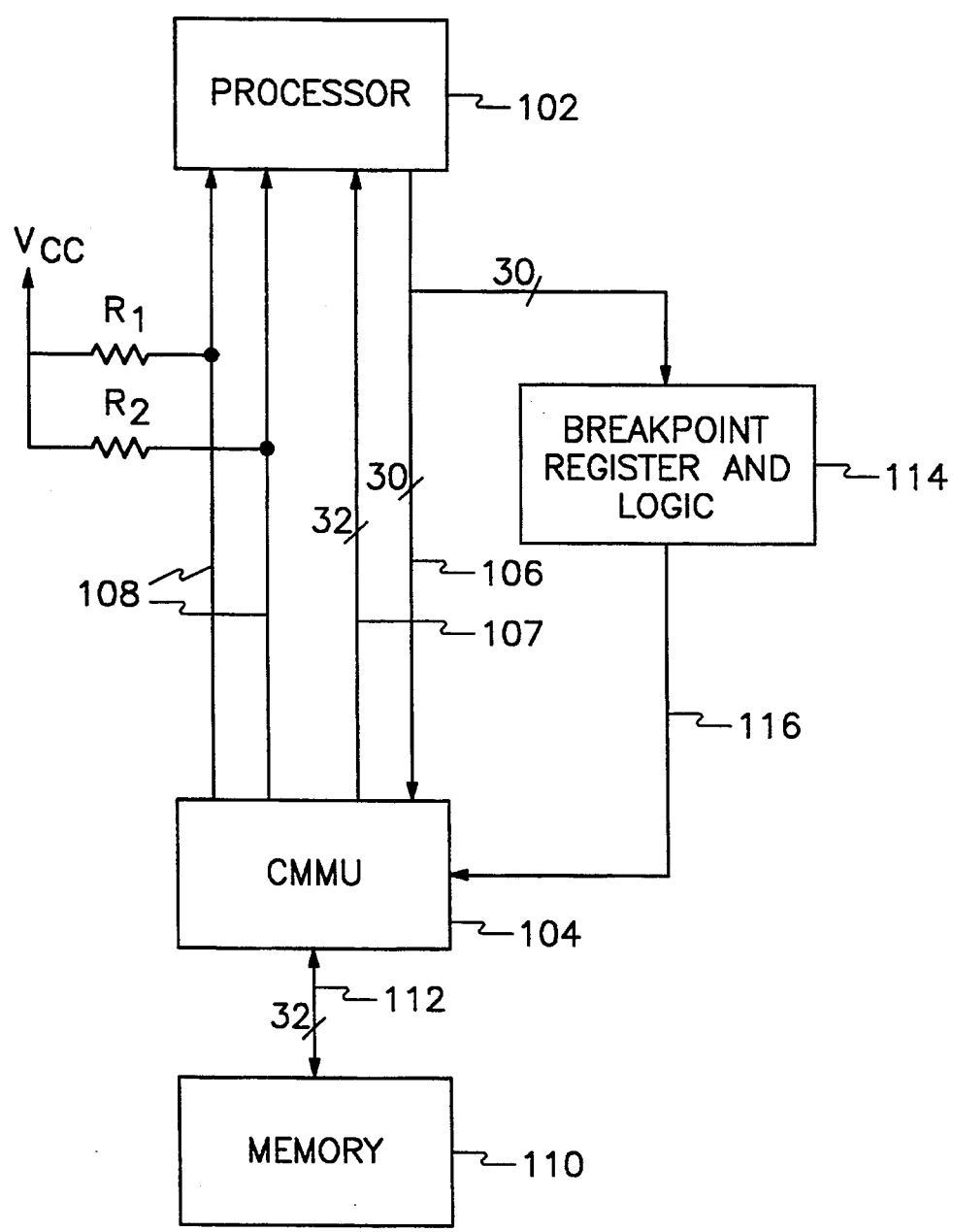
FIG. 1 is a block diagram showing the system of the present invention.

FIG. 1 shows an example system diagram for the present invention. Because this invention is only concerned with instruction address breakpoints, only the instruction fetch portion of the system is shown.

A microprocessor 102 is connected to an instruction CMMU 104 via a code address bus 106, a code instruction bus 107, and a code reply bus 108. CMMU 104 is connected to a memory 110 (e.g., a DRAM) by a memory bus 112. Breakpoint register and logic circuit (BRLC) 114 is connected to the code address bus 106. A chip select line 116 connects BRLC 114 to a chip select terminal of CMMU 104.

Microprocessor 102 is preferably the MC88100 microprocessor. CMMU 104 is preferably the MC88200 cache and memory management unit. Note, however, that the MC88204 (64 kB cache) CMMU is pin-for-pin compatible with the MC88200 (16 kB cache) CMMU and may be substituted therefor. Code address bus 106 is a 30-bit word address bus which allows microprocessor 102 to provide a virtual instruction (code) address to CMMU 104. CMMU 104 converts the virtual address to a physical address and checks its internal cache for the requested instruction. If the requested instruction is in the cache, then CMMU 104 returns it to microprocessor 102 over code instruction bus 107. If the requested instruction is not found in the internal cache, then CMMU 104 fetches one or more words containing the appropriate instruction from memory 110 over memory bus 112, and returns the fetched instruction to microprocessor 102 over code instruction bus 107. Memory bus 112 is a 32-bit wide bi-directional bus. Code reply bus 108 is a 2-bit wide bus which provides instruction fetch status information to processor 102. For the MC88100, code reply bus 108 is connected to pins CR0 and CR1. Pull-up resistors R1 and R2 connect code reply bus 108 to a logic supply voltage Vcc.

CMMU 104 can return one of three possible code reply signals to microprocessor 102 over code reply bus 108:

(1) WAIT,
(2) VALID memory access, O.K. to cycle, or
(3) FAULT.

One of these code reply signals is always present on code reply bus 108. For example, upon receipt of an instruction address from microprocessor 102, CMMU 104 will check the virtual address. If the address is valid, CMMU 104 will output the proper physical address on memory bus 112 and receive one or more instructions back over the same bus. During this time, a WAIT code will be asserted on code reply bus 108. Once the instruction has been fetched and is ready to be sent to microprocessor 102, a VALID reply code is asserted.

The chip select terminal of CMMU 104 is normally used to select from among several CMMU's which are connected in parallel. Chip select line 116 is a single-bit line. When chip select line 116 pulls the chip select terminal to a logical HIGH, the CMMU will be disabled, resulting in a FAULT (both lines at a logical HIGH) status being asserted on code reply bus 108 by pull-up resistors R1 and R2. The present invention uses the chip select terminal of CMMU 104 to signal a breakpoint exception to microprocessor 102.

Figure 2:
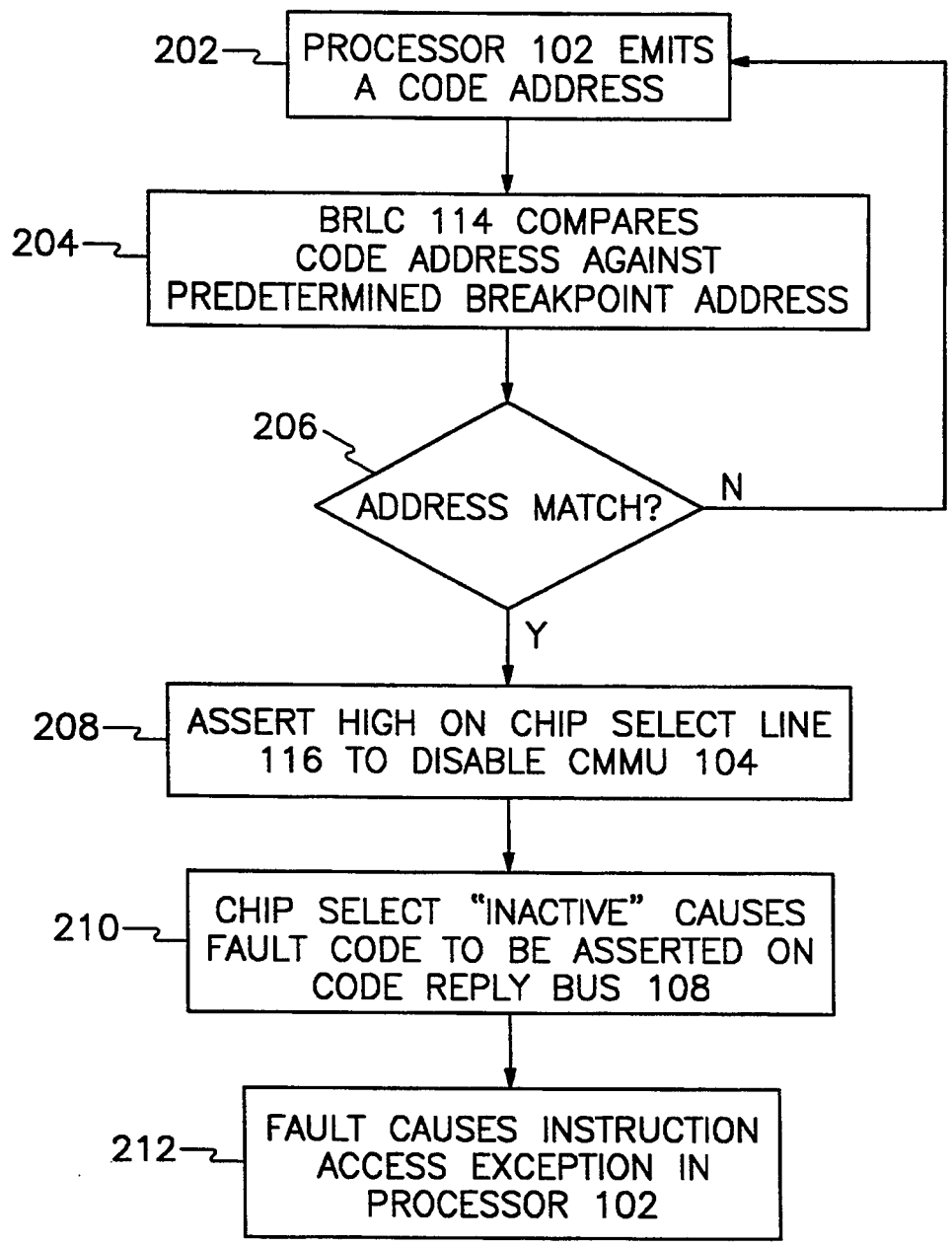
FIG. 2 is a flow chart illustrating processing of a breakpoint exception.

FIG. 2 is a flow chart illustrating the processing of a breakpoint. At step 202, microprocessor 102 emits a code address. At step 204, BRLC 114 compares the emitted code address to a predetermined breakpoint address. If no match is found, at step 206, microprocessor 102 will fetch and execute the instruction.

If BRLC finds a match, at step 206, then a breakpoint is processed. At step 208, a match signal (logical HIGH) is asserted on chip select line 116. This will cause CMMU 104 to assert a FAULT signal on code reply bus 108 through pull-up resistors R1 and R2 (Step 210). A FAULT signal on code reply bus 108 will cause microprocessor 102 to execute an instruction access exception at step 212.

Figure 3:
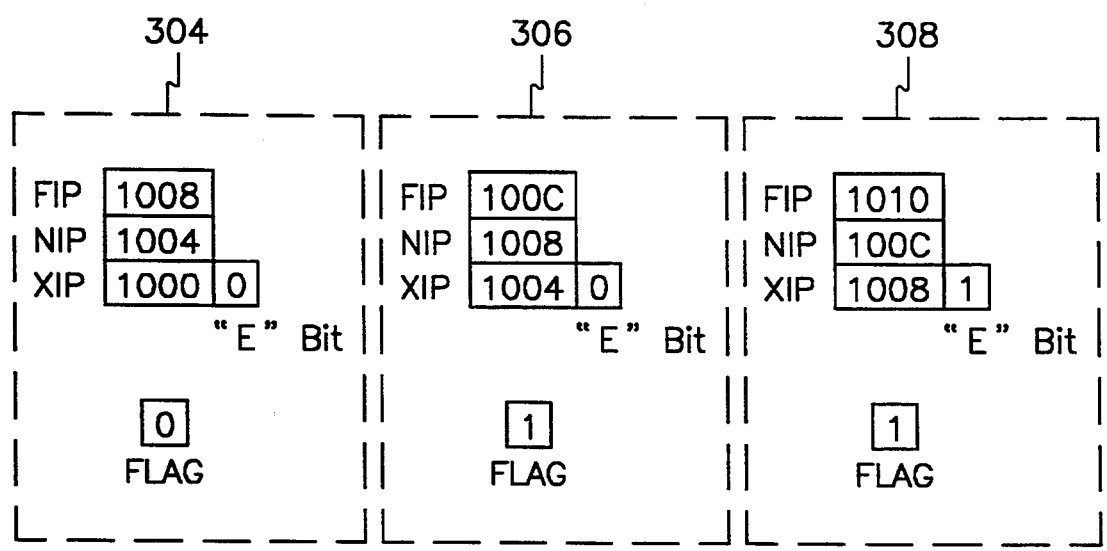
FIG. 3 shows an excerpt of sample code and the corresponding contents of the internal registers of processor 102 as a breakpoint exception is processed.

The sequence of events occurring internal to microprocessor 102 is now illustrated by way of an example in FIG. 3. A sample excerpt of code 302 is shown. Address 1008 is shown as the code instruction address which causes a breakpoint. At blocks 304, 306 and 308, the contents of the Fetch Instruction Pointer (FIP), the Next Instruction Pointer (NIP), and the Execute Instruction Pointer (XIP) of microprocessor 102 are shown.

Block 304 shows the contents of the FIP, NIP and XIP at the time the instruction address which causes the breakpoint is fetched. Note that the breakpoint address is in the FIP. Block 306 shows the contents of the FIP, NIP and XIP after the next microprocessor clock cycle. Note that the breakpoint address has propagated to the NIP after the transaction has been initiated but before the code reply signal (e.g., FAULT) is received via code reply bus 108. This occurs because the instruction fetch and code replies are pipelined.

An instruction unit in microprocessor 102 maintains copies of the FIP, NIP, and XIP in internal registers so that full recovery can be accomplished after an exception. The internal registers are part of a shadow instruction pipeline and are known as the Shadow Fetch Instruction Pointer (SFIP), the Shadow Next Instruction Pointer (SNIP), and the Shadow Execute Instruction Pointer (SXIP).

When the FAULT signal is received on code reply bus 108, microprocessor 102 sets an internal flag to prevent execution of the instruction in the NIP. Block 308 shows the contents of the FIP, NIP and XIP after the next microprocessor clock cycle. Note that the breakpoint address has now propagated to the XIP. The internal flag set during the last clock cycle now causes an "E" (error) bit of the instruction address in the XIP to be set. The "E" bit will force an instruction access fault if execution of the instruction is attempted. Thus, microprocessor 102 will not execute the instruction at the breakpoint address.

At this point, microprocessor 102 initiates exception processing. In the case of the preferred embodiment wherein microprocessor 102 is a Motorola MC88100, the processor freezes the execution context (i.e., the contents of the FIP, NIP and XIP are preserved in the SFIP, SNIP and SXIP, respectfully), freezes the floating-point unit (FPU), explicitly disables interrupts, clears the register scoreboard, and enters the supervisor mode whereby a breakpoint handler routine can control execution.

After the exception has been processed, microprocessor 102 backs up the shadow instruction pipeline, restores the execution context, and then resumes execution with the instruction that caused the exception.

If single cycle stepping (i.e., execution of one instruction at a time) of microprocessor 102 is desired, it can be implemented by the exception software. To perform single cycle step execution, the exception software would set the "E" bit for the instruction in the SFIP (which will be restored to the FIP) before the execution context is restored. When the execution context is restored and normal execution resumes, microprocessor 102 will execute the instruction in the XIP (which caused the previous breakpoint exception) and then take an exception on the next instruction.

Breakpoint exceptions may be disabled by having software set a "V" (valid) bit within the instruction address in the XIP. If the "V" bit is cleared (logical zero), then the "E" bit will be ignored. A more detailed description of exception handling for the MC88100 is presented in the Motorola MC88100 User's Manual in Section 6, which is incorporated herein by reference.

Since the code reply FAULT signal (breakpoint exception) propagates in the code instruction pipeline in step with the instruction itself, this scheme yields a "precise" exception. The exception (interrupt) will be linked to the exact instruction whose address caused the exception.

Figure 4:
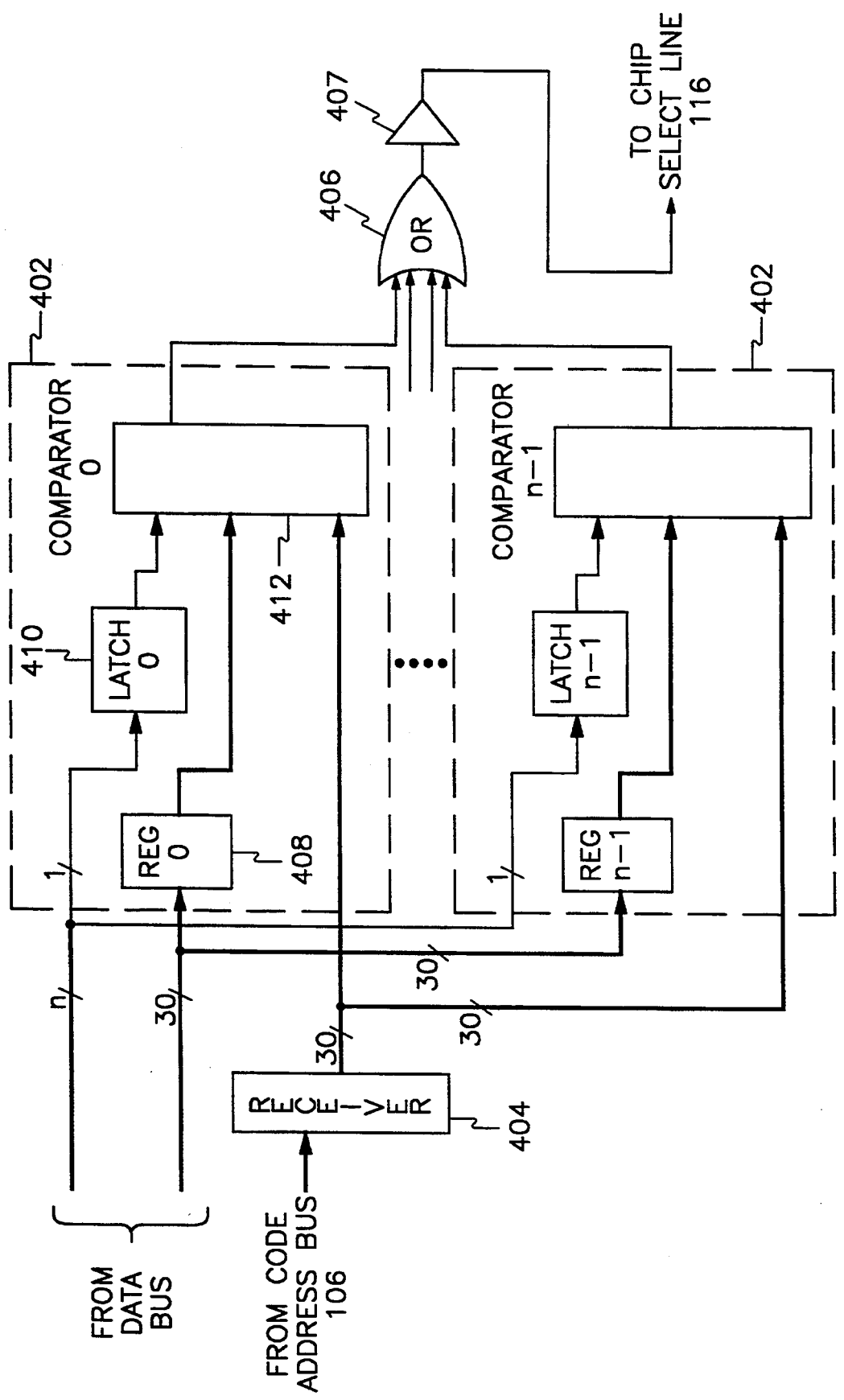
FIG. 4 is a block diagram showing the breakpoint register and logic circuit 114.

BRLC 114 is shown in FIG. 4. BRLC includes a line receiver 404, (n) address comparing circuits 402, an n-input OR gate 406, and a line driver 407. Each circuit 402 is capable of handling one breakpoint address. Thus, (n) address comparing circuits 402 will allow (n) breakpoints to be used. Because circuits 402 will be identical in structure and operation, only one is discussed for illustration purposes.

Each circuit 402 contains a breakpoint register 408, a breakpoint enable latch 410 and a breakpoint address comparator 412. The input of receiver 404 is connected to code address bus 106. The output of receiver 404 is input to comparator 412. Register 408 is a 32-bit register used for storing a breakpoint address. Register 408 is loaded by maintenance code via a data bus. The output of register 408 is input to comparator 412. Latch 410 is a one-bit latch which is also loaded by maintenance code. The output of latch 410 is input to comparator 412.

A pre-determined breakpoint address is supplied to breakpoint register 408 via a data bus. Because the code address is a word address, the two least significant bits will always be zero. The code address from the code address bus 106 is passed to comparator 412 by receiver 404. Comparator 412 is a thirty bit comparator. The signal from latch 410 will act as an enable signal. Thus, comparator 412 will output a logical HIGH if the address from the code address bus 106 matches the address from breakpoint register 408 and if latch 410 is set to a logical HIGH. The single bit outputs from each comparator 412 of each circuit 402 are logically "ORed" together by OR gate 406. The output of OR gate 406 is connected to line driver 407 which will drive chip select line 116.

A match of any breakpoint address will cause a match signal (logical HIGH) to be asserted on chip select line 116 if the corresponding latch 410 is set to a logical HIGH. A match signal will initiate the breakpoint exception process. The timing of the breakpoint signal to the code reply input of the MC88100 is "tight" with respect to MC88100/MC88200 signal timing requirements. Therefore, to provide more leeway to the timing signals, the MC88100 and MC88200 are operated at 25 MHz rather than the rated 33 MHz.

Figure 5:
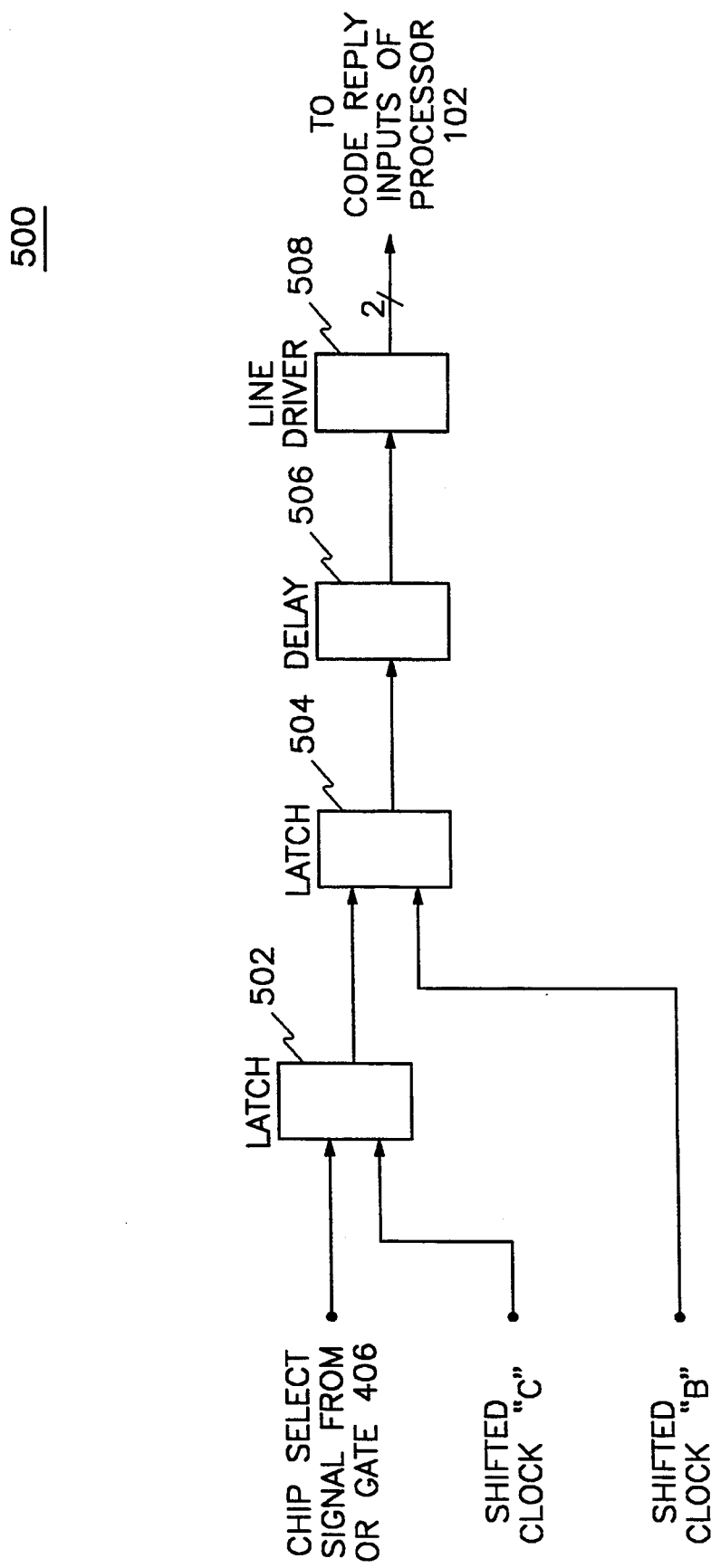
FIG. 5 is a block diagram of code reply circuit 500.

In an alternate embodiment of this invention where the MC88100 microprocessor (102) is used without the MC88200 CMMU (104), a code reply circuit 500 may be used to directly generate a code reply signal having the proper timing characteristics. Code reply circuit 500 is shown in FIG. 5. The match signal generated by OR gate 406 (before line driver 407) is input to code reply circuit 500 to generate the code reply signal and to simulate the time delays of the MC88200 CMMU.

Code reply circuit 500 includes latches 502 and 504, delay circuit 506, and line driver 508. Latches 502 and 504 are level sensitive scan design (LSSD) latches. The chip select signal from OR gate 406 is fed into the signal input of latch 502. A shifted clock "C" and a shifted clock "B" are generated by external circuitry (not shown). Clocks "C" and "B" are connected to the clock inputs of latches 502 and 504 respectively. Together, latches 502 and 504 form an LSSD latch pair. Clocks "C" and "B" are shifted with respect to the MC88100 system clock such that the combination of latches 502 and 504 introduces a 20 ns delay into the match signal.

The output of latch 504 is fed into delay circuit 506. Delay circuit 506 will introduce an additional delay of several nano-seconds into the match signal. The delay of delay circuit 506 must not exceed 10 ns. The output of delay 506 is connected to line driver 508. Line driver 508 outputs the code reply signal (delayed match signal) onto code reply bus 108. Propagation delay along code reply bus 108 provides an additional delay on the order of several nano-seconds.

Figure 6:
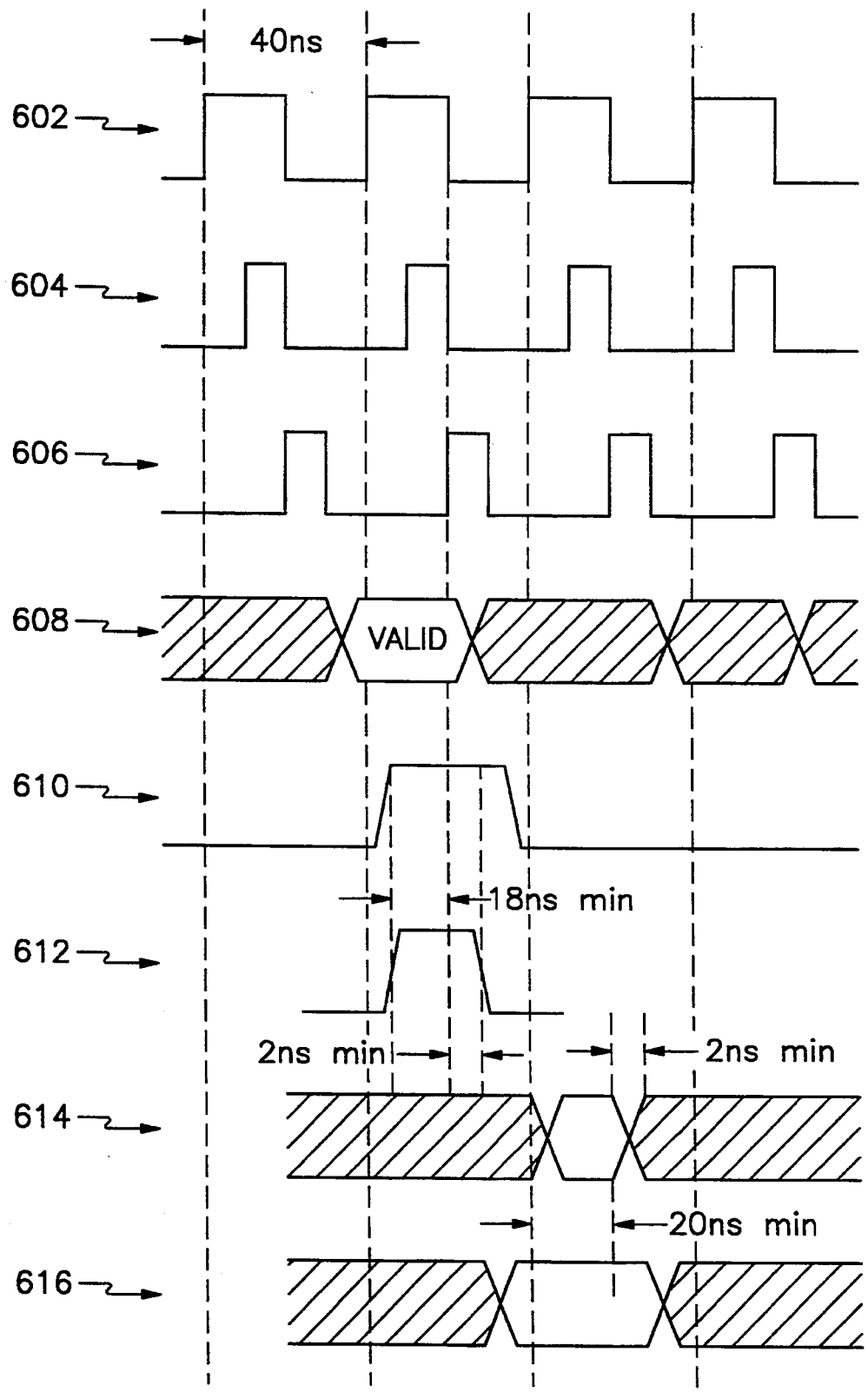
FIG. 6 is a sample timing diagram for the invention.

A sample timing diagram is shown in FIG. 6. Waveform 602 depicts the MC88100 system clock. Waveforms 604 and 606 show shifted clocks "C" and "B" respectively. Note that the trailing edge of shifted clock "C" and the leading edge of shifted clock "B" are each delayed 20 ns from the leading edge of the MC88100 system clock. Waveform 608 illustrates code address bus 106 timing. Waveform 610 shows the timing for a sample match signal from OR gate 406, Waveform 612 shows the timing requirements for the MC88200 chip select terminal. Waveform 614 shows the timing requirements for the MC88100 code reply terminals (CR0 and CR1). Waveform 616 illustrates the timing for a code reply signal produced by code reply circuit 500.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. In a pipelined processor system of a type including an integrated circuit pipelined microprocessor located on a first substrate and an instruction cache and memory management unit (CMMU) located on a second substrate, different from said first substrate, where code addresses are sent to the instruction CMMU and the instruction CMMU returns with code instructions and returns with a FAULT code reply signal when there is no reply code, and wherein an exception is forced to the pipelined microprocessor in response to the FAULT code reply signal, a breakpoint system for providing a breakpoint exception at a predetermined instruction address, said breakpoint system comprising:
at least one breakpoint register for storing a predetermined breakpoint address;
means for comparing the code addresses which are sent to the instruction CMMU with said predetermined breakpoint address in said at least one breakpoint register, and for generating a match signal when equivalent addresses are detected;
means for providing said match signal to a chip select input on the instruction CMMU; and
means coupled to a chip select input on the instruction CMMU, for causing the instruction CMMU to issue the FAULT code reply signal when said match signal is provided to said chip select input, whereby an exception is forced in the pipelined microprocessor.

2. The breakpoint system of claim 1, wherein the pipelined microprocessor is a Motorola MC88100.

3. The breakpoint system of claim 2, wherein the instruction CMMU is a Motorola MC88200.

4. The breakpoint system of claim 2, wherein the instruction CMMU is a Motorola MC88204.

5. A pipelined processor system having hardware assisted breakpoint capabilities, said system comprising:
an integrated circuit pipelined microprocessor of a type which issues a code address and, in response to said code address, receives a code instruction for execution and receives a code reply signal, said pipelined microprocessor being forced to take an exception by a FAULT code reply signal, said integrated circuit pipelined microprocessor located on a first substrate;

an instruction cache and memory management unit (CMMU) located on a second substrate, different from said first substrate, said instruction CMMU adapted to receive code addresses from said pipelined microprocessor and to return code instructions to said pipelined microprocessor, said instruction CMMU outputting said FAULT code reply signal in response to a match signal on an instruction CMMU chip select input;

at least one breakpoint register for storing a predetermined breakpoint address;

comparing means for comparing said code addresses which are sent to said instruction CMMU with said predetermined breakpoint address in said at least one breakpoint register, and for generating said match signal when equivalent addresses are detected;

means, coupled to said comparing means, for providing said match signal to said instruction CMMU chip select input; and means for providing said FAULT code reply signal to said pipelined microprocessor.

6. The processor system set forth in claim 5, wherein said pipelined microprocessor is a Motorola MC88100.

7. The processor system set forth in claim 6, wherein said instruction CMMU is a Motorola MC88200.

8. The processor system set forth in claim 6, wherein said instruction CMMU is a Motorola MC88204.

9. A method for providing a hardware assisted breakpoint facility in a processor system of a type including an integrated circuit pipelined microprocessor, located on a first substrate, and an instruction cache and memory management unit (CMMU) located on a second substrate, different from said first substrate, wherein code addresses are sent to the instruction CMMU and the instruction CMMU returns with code instructions and with a code reply signal, and wherein the pipelined microprocessor is forced to take an exception by a FAULT code reply signal, said method comprising the steps of:

(1) storing a predetermined breakpoint address in a breakpoint register;

(2) comparing each code address sent to the instruction CMMU by the pipelined microprocessor to said predetermined breakpoint address;

(3) generating a match signal when equivalent addresses are detected;

(4) outputting said match signal to a chip select input of the instruction CMMU;

(5) generating the FAULT code reply signal in response to said match signal; and (6) outputting said FAULT code reply signal to the pipelined microprocessor, whereby the pipelined microprocessor is forced to take an exception at said predetermined breakpoint address.

* * * * *